N. L. HOLMES,
Assignor, by mesne assignments, to FISH BROS & Co.
Vehicle Axle Skein and Box.
No. 8,766. Reissued June 24, 1879.
FIG. I.
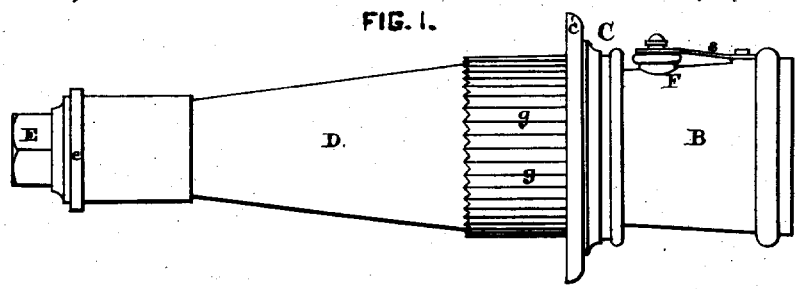
FIG. II.
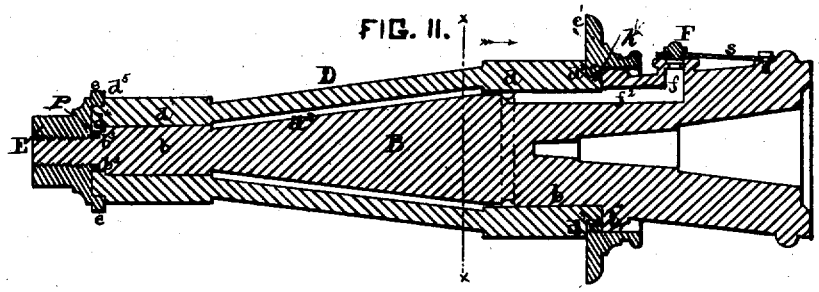
FIG. III.
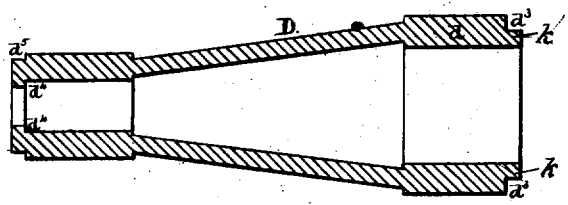
FIG. IV.
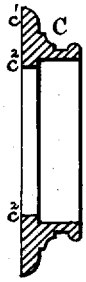
FIG. V.
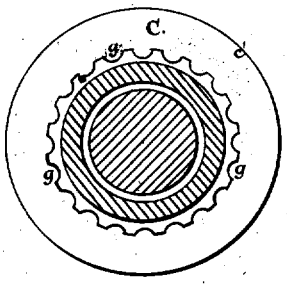
FIG. VI.
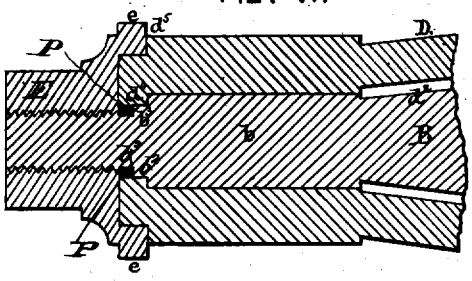
WITNESSES:
Irving T. Ford.
E. G. Asmus
INVENTOR:
Nathan L. Holmes,
By S. S. Stout
Attorney.
N. PETERS, PHOTO-LITHOGRAPHER, WASHINGTON, D. C.

UNITED STATES PATENT OFFICE.

NATHAN L. HOLMES, OF FOND DU LAC, ASSIGNOR, BY MESNE ASSIGNMENTS, TO FISH BROTHERS & CO., OF RACINE, WISCONSIN.

IMPROVEMENT IN VEHICLE-AXLE SKEINS AND BOXES.

Specification forming part of Letters Patent No. 142,233, dated August 26, 1873; Reissue No. 8,766, dated June 24, 1879; application filed May 7, 1879.

*To all whom it may concern:*

Be it known that I, NATHAN L. HOLMES, of Fond du Lac, in the county of Fond du Lac and State of Wisconsin, have invented certain new and useful Improvements in Thimble-Skeins; and I do hereby declare that the following is a full, clear, and exact description thereof, reference being had to the accompanying drawings, making part of this specification.

Figure I is a side view of my invention; Fig. II, a longitudinal section; Fig. III, a longitudinal section of the axle-box; Fig. IV, a horizontal section of the sand-band; Fig. V, a cross-section of the axle box and skein on line $x\ x$, Fig. II. Fig. VI is an enlarged section of the box and skein.

My invention relates to axle boxes and skeins; and consists in providing the axle-boxes of a carriage or wagon with a reduced portion on its inner end for sustaining the sand-band, and leaving thereby a shoulder for the said sand-band to abut against; also, the combination of an axle-box having a reduced portion and shoulder with a sand-band having depending rim, and an axle-skein having a shoulder to clasp the rim of the sand-band between it and the shoulder on the box, with other details of construction.

The end of the axle is made in the usual form, and the skein B is hollowed out to fit upon it, as is also usual.

On the outside of the skein, instead of the continuous tapering bearing for the entire length of the skein, I prefer to provide it with two bearing-surfaces, $b\ b$, separated by the tapering groove $d^2$.

The rear or inner end of the axle-box D is shouldered at $d^3$, leaving a reduced portion, $k$. This shoulder $d^3$ is intended to come flush with the inner face of the hub, leaving the reduced portion $k$ protruding.

The sand-band C is formed with an outer flange, $c^1$, and an inner flange, $c^2$, and the skein is provided with a shoulder, $b^4$.

When the box D is in place in the hub, the sand-band may be slipped over the reduced portion $k$, which will center it, and when the hub is in place on the skein the flange $c^2$ of the sand-band will be clasped between the shoulder $d^3$ on the box and another shoulder, $b^4$, on the skein sufficiently snug to prevent the exit of the grease without being too tight to prevent a free revolution of the box.

On the outer end the box D is provided with a flange, $d^4$, to fit upon a reduced portion, $b^2$, of the skein. This flange is wider than the reduced portion, and projects beyond it, leaving a recess, $b^3$, into which a washer, P, is fitted. The nut E is then screwed on, and holds the parts together, the washer preventing any egress of the oil from the box.

I claim as my invention—

1. An axle-box having a reduced portion, $k$, and shoulder $d^3$, in combination with the sand-band C, as and for the purpose set forth.

2. The combination of an axle-box having a reduced portion, $k$, and shoulder $d^3$, and a skein having shoulder $b^4$, with a sand-band having flange $c^2$, as and for the purpose set forth.

3. The combination of a skein having a reduced portion, $b^2$, with the box having projecting flange $d^4$, washer P, and nut, substantially as set forth.

NATHAN L. HOLMES.

Witnesses:
JOHN C. HUGGINS,
S. S. STOUT.